July 14, 1925.  
G. B. CRUTCHFIELD  
CUSHION TIRE  
Filed Feb. 7, 1925  
1,545,741  
2 Sheets-Sheet 1

Inventor  
G. B. Crutchfield  
By C. A. Snow & Co.  
Attorney

July 14, 1925.
G. B. CRUTCHFIELD
CUSHION TIRE
Filed Feb. 7, 1925  2 Sheets-Sheet 2
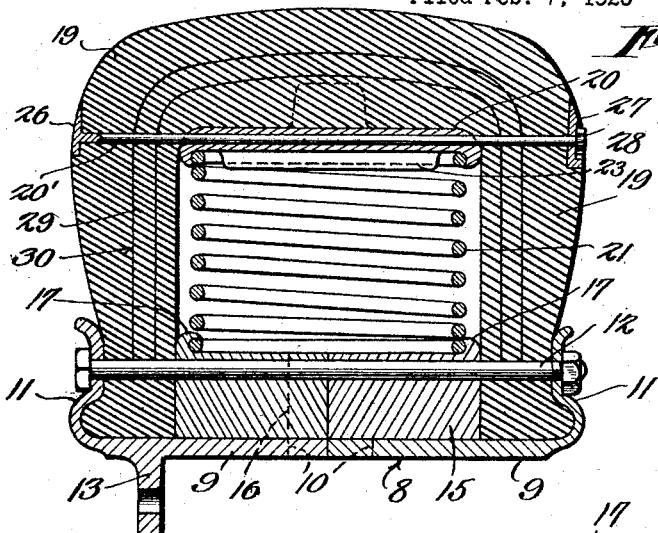
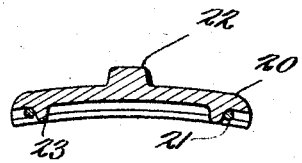
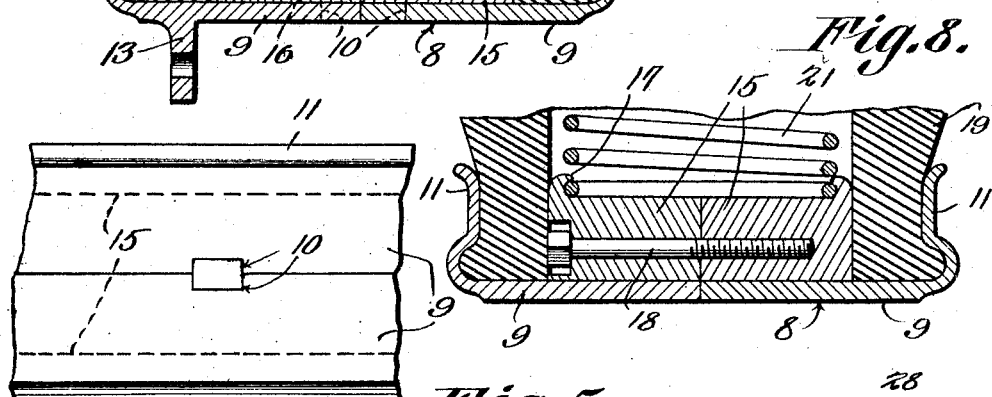
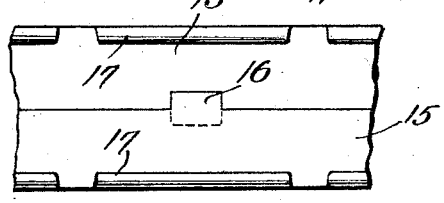
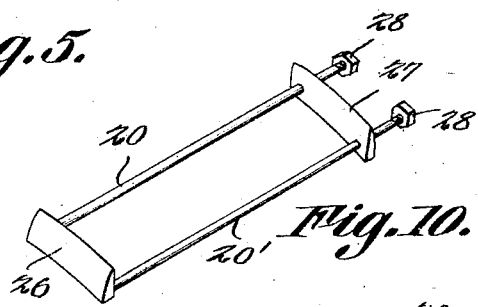
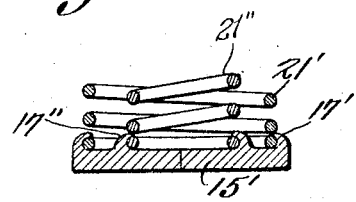
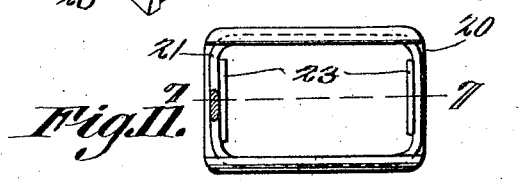
Inventor
G. B. Crutchfield
By C. A. Snow & Co.
Attorney Patented July 14, 1925.

1,545,741

UNITED STATES PATENT OFFICE.

GRAVES B. CRUTCHFIELD, OF ENGLAND, ARKANSAS, ASSIGNOR OF ONE-HALF TO WILLIAM A. CRUTCHFIELD, OF LITTLE ROCK, ARKANSAS.

CUSHION TIRE.

Application filed February 7, 1925. Serial No. 7,621.

*To all whom it may concern:*

Be it known that I, GRAVES B. CRUTCHFIELD, a citizen of the United States, residing at England, in the county of Lonoke and State of Arkansas, have invented a new and useful Cushion Tire, of which the following is a specification.

This invention relates to cushion tires, and aims to provide a cushion tire possessing the resilient qualities of a pneumatic tire.

An object of the invention is to provide a device of this character including a plurality of springs, novel means being provided for securing the springs in position, to eliminate movement of the spring securing means within the rim and tire, forming a part of the invention.

A still further object of the invention is to provide means for connecting the ends of the tire cover, in a manner to insure against the ends of the tire becoming disconnected.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 4 is a sectional view taken on line 4—4 of Figure 1.

Figure 5 is a fragmental plan view of the main supporting rim.

Figure 6 is a fragmental plan view of the sectional spring supporting member.

Figure 7 is a sectional view taken on line 7—7 of Figure 11.

Figure 8 is a fragmental sectional view through the supporting rim and sectional spring supporting member on the line 8—8 of Fig. 1.

Figure 9 is a sectional view through a modified form of spring supporting member.

Figure 10 is a perspective view of a novel form of bolt employed for securing the ends of the tire.

Figure 11 is a plan view of one of the spring caps.

Figure 1:
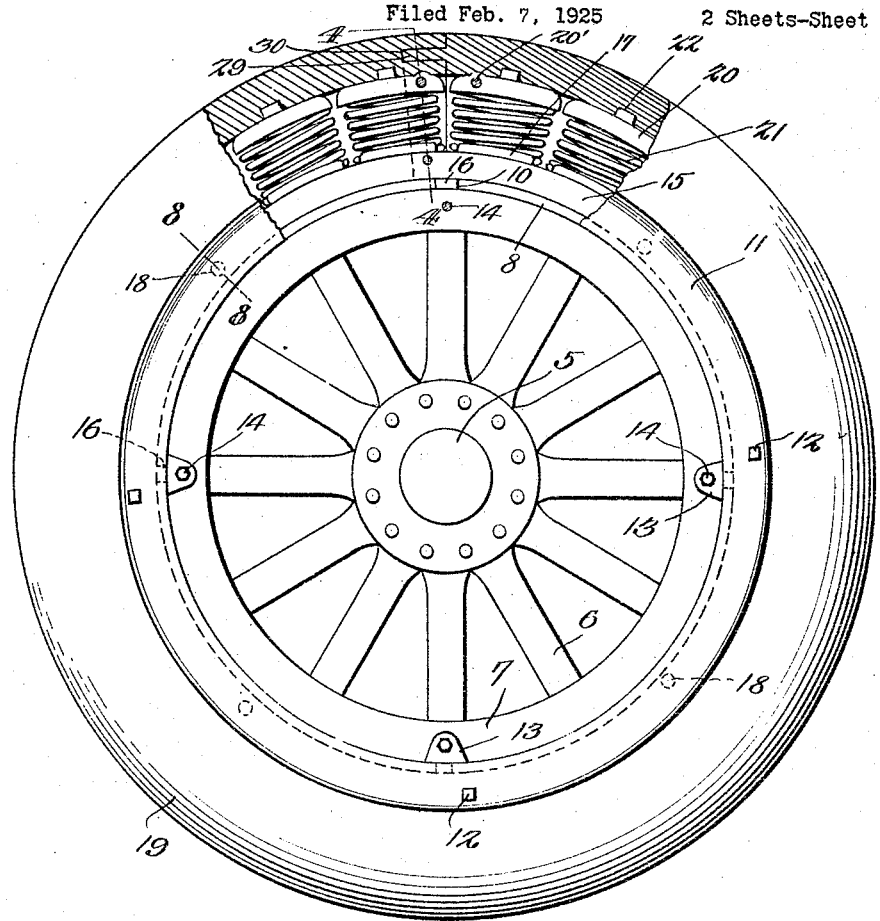
Figure 1 is a side elevational view of a tire constructed in accordance with the invention, the tire being partly broken away to illustrate the spring members.

Referring to the drawings in detail, the hub of the wheel is indicated by the reference character 5 and the spokes which radiate therefrom are indicated at 6, the spokes being connected with the felloe 7 in the usual and well known manner.

The reference character 8 indicates generally the main supporting rim of the wheel and as shown, includes separable sections 9 that are provided with cut out portions 10 adapted to register to provide openings for the reception of lugs to be hereinafter more fully described, so that the sections of the rim will be securely locked against movement with respect to each other.

Flanges 11 are provided on the sections 9 of the rim which flanges have suitable openings to receive the bolts 12 that secure the tire to the rim.

Figure 2:
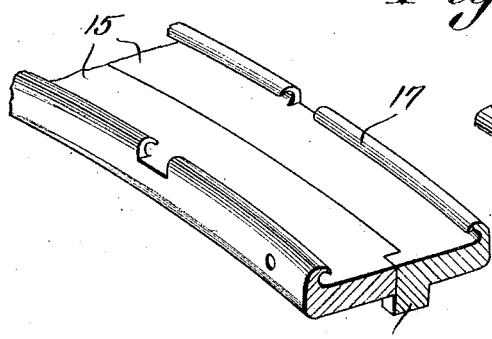
Figure 2 is a fragmental perspective view illustrating the sectional spring supporting ring members.
Figure 3:
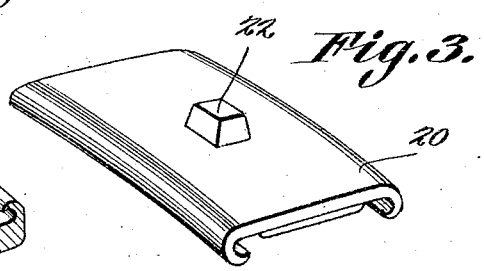
Figure 3 is a perspective view of one of the spring caps.

Ears 13 extend from one of the sections of the rim 8 and are adapted to be brought into registry with suitable openings formed in the felloe 7 to receive securing bolts indicated at 14, whereby the rim may be secured to the wheel proper. Positioned on the rim 8 is a spring supporting member that includes separable sections 15, one of said sections being provided with cut out portions, while the opposite section is provided with lugs 16, the lugs being relatively thick as shown by Figure 2 of the drawings so that they may be positioned within the cut out portions 10 to lock the spring supporting member to the rim and insure against creeping of the spring supporting member, over the rim.

As clearly illustrated by Figure 8 of the drawing, the spring supporting member is formed with inwardly extended flanges 17, which are slightly curved to conform to the curvature of the spring positioned therein, so that the springs will be securely held against movement.

Suitable bolt opennigs are formed in the sections of the spring supporting member and accommodate the bolts 18 that secure the sections of the spring supporting member together. The spring supporting member is also provided with suitable bolt openings to accommodate the securing bolts 12 that are of lengths to pass through the flanges 11 and secure the spring supporting member in position within the rim 8.

Positioned on the rim 8 is the tire casing 19 that is also provided with openings to accommodate the bolts 12 that secure the spring supporting member, tire shoe and rim 8 together. A cap indicated at 20 is positioned on the outer end of each coiled spring member 21, the caps being shown as provided with lugs 22 that are positioned in suitable openings formed in the inner surface of the tire casing, to the end that the caps are restricted against movement with respect to the tire shoe.

Ribs 23 are formed integral with the caps and act to engage the springs to prevent them from moving circumferentially with respect to the caps. Openings are also formed in certain caps to accommodate the bolts 20' that also extend through the tire casing 19 for securing the caps against movement with respect to the casing, and at the same time hold the ends of the casing 19 together, the bolts 20' being connected by means of the bar 26, while the movable bar 27 is positioned over the opposite ends of the bolts 20' and held in position by means of the nuts 28.

One end of the casing 19 is formed with a tongue 29 that fits in the groove 30 formed in the opposite end of the casing, the openings in the casing that receive the bolts 20' being arranged on opposite sides of the tongue 29 so that when the bolts are positioned, the ends of the sections of the casing 19 will be secured against displacement with respect to each other.

In the modified form of the invention as shown by Figure 9 of the drawings, the spring supporting member which is indicated at 15' is sectional in formation and is provided with radially outwardly extended lugs 17' adapted to receive the outer coiled spring 21' while within the central portion of the support are radially outwardly extended lugs 17'' adapted to embrace portions of the inner coiled spring 21 to hold it in position.

I claim:—

1. In a device of the character described, a sectional rim, a sectional spring supporting member mounted on the rim, a casing positioned on the rim, means extending through the casing and spring supporting member for securing the spring supporting member to the rim and casing, and a plurality of coiled springs held within the casing.

2. In a device of the character described, a rim, a sectional spring supporting member mounted on the rim, radially outwardly and laterally inwardly extended flanges forming a part of the spring supporting member, said flanges adapted to provide securing members, coiled springs positioned under the securing members, a casing, and means extending through the rim, sectional spring supporting member, and casing, for securing the casing and spring supporting member in position.

3. A cushion tire including a rim, a spring supporting member mounted on the rim, flanges forming a part of the spring supporting member, coiled springs mounted under the flanges, a casing adapted to house the springs, and means for securing the casing to the rim and spring supporting member.

4. A cushion tire including a rim, said rim having openings formed therein, a sectional spring supporting member mounted on the rim, one of said sections having cut out portions, the opposite section having lugs fitted in the cut out portions, said lugs adapted to extend into the openings of the rim to lock the spring supporting member to the rim, coiled springs mounted on the spring supporting member, caps mounted on the outer ends of the springs, a casing surrounding the springs and mounted on the rim, and means for securing the casing to the rim.

In testimony that I claim the foregoing as my own, I have hereto affixed my signature.

GRAVES B. CRUTCHFIELD.